United States Patent [19]
Graber

[11] 4,085,874
[45] Apr. 25, 1978

[54] AUTOMOBILE BICYCLE CARRIER

[76] Inventor: Joseph V. Graber, 3739 County Trunk M, Middleton, Wis. 53562

[21] Appl. No.: 646,175

[22] Filed: Jan. 2, 1976

[51] Int. Cl.² ............................................. B60R 9/10
[52] U.S. Cl. ........................... 224/29 R; 224/42.03 B; 248/207; 248/291
[58] Field of Search ................ 224/5 E, 29 R, 42.01, 224/42.03 R, 42.03 A, 42.03 B, 42.07, 42.08, 42.1 R, 42.1 E, 42.43, 42.44, 42.45 R, 42.45 A, 42.45 B; 248/207, 291; 403/92, 98; 211/17, 18, 19, 22

[56] References Cited
U.S. PATENT DOCUMENTS

| | | | |
|---|---|---|---|
| 3,710,999 | 1/1973 | Allen | 224/42.03 B |
| 3,712,522 | 1/1973 | Penniman | 224/29 R |
| 3,792,805 | 2/1974 | Binding et al. | 224/29 R |
| 3,794,227 | 2/1974 | Stearns | 211/22 X |
| 3,921,869 | 11/1975 | Rogers | 224/42.03 B |
| 3,927,810 | 12/1975 | Danon | 224/42.03 B |
| 3,927,811 | 12/1975 | Nussbaum | 224/42.03 B |

FOREIGN PATENT DOCUMENTS 87,465  9/1936  Sweden .................... 224/42.03 R Primary Examiner—Robert J. Spar
Assistant Examiner—Winston H. Douglas
Attorney, Agent, or Firm—Morsbach & Pillote

[57] ABSTRACT

An automobile bicycle carrier having spaced rigid side frames providing vehicle engaging feet on the ends thereof and bicycle support members attached by mounting plates to the side frames for angular adjustment relative thereto about a pivot axis extending crosswise between the side frames. The mounting plates have a plurality of openings arranged in an arcuate pattern concentric with the pivot axis to enable adjustment of the support members relative to the side frames so that the support members can extend generally horizontally when the carrier is mounted with the vehicle engaging feet in different positions between a generally horizontal plane and a generally upright plane to adapt the carrier for use on vehicles of widely different types.

6 Claims, 6 Drawing Figures

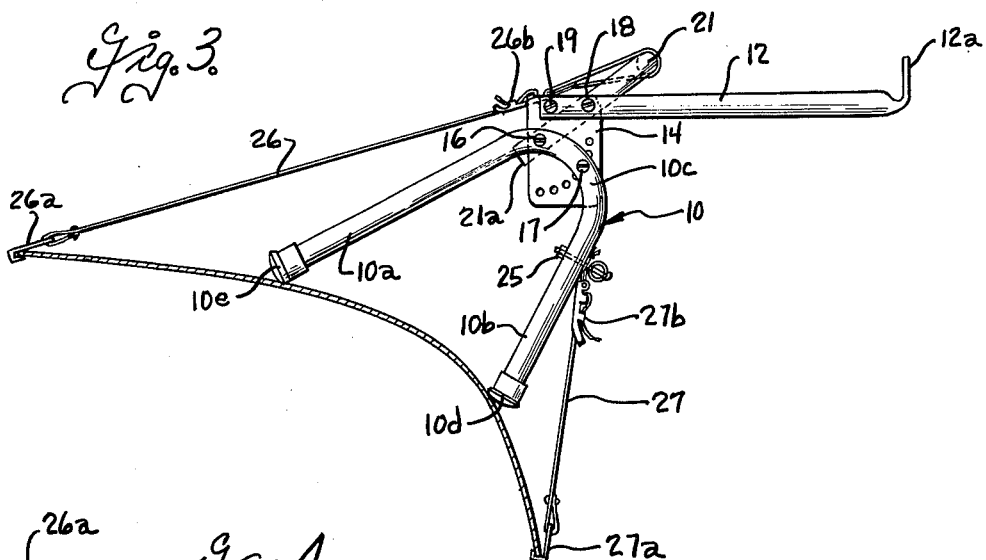
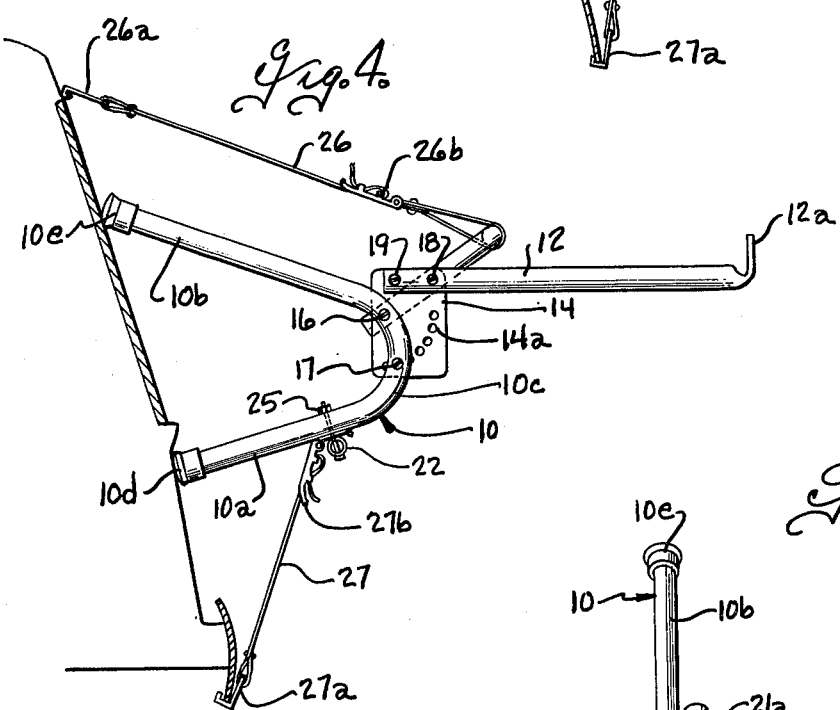
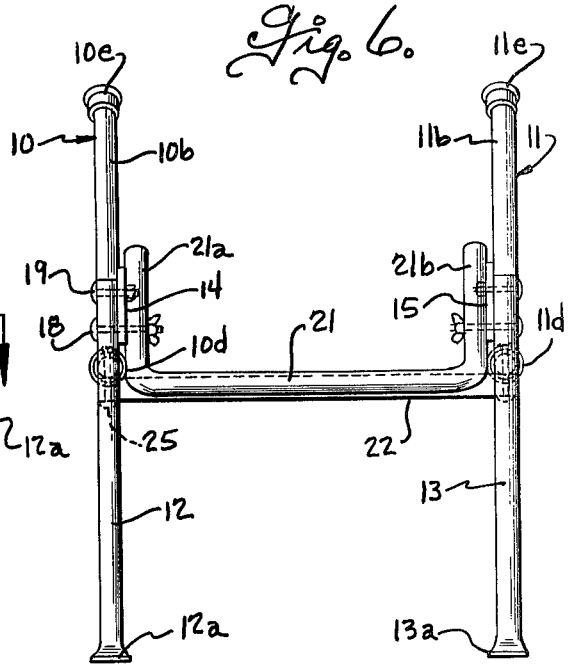
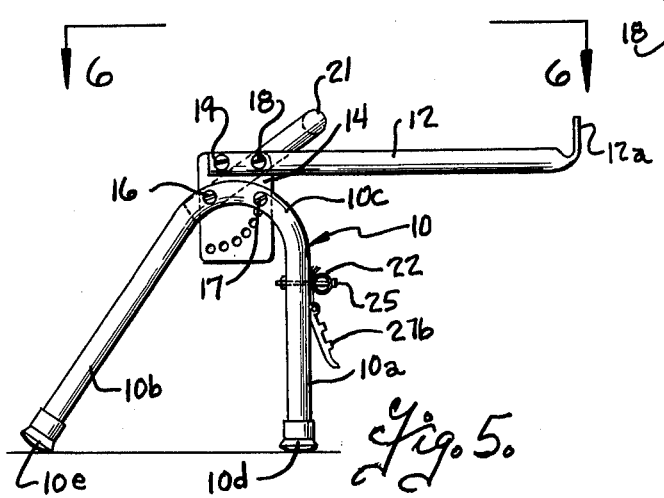

AUTOMOBILE BICYCLE CARRIER

BACKGROUND OF THE INVENTION

Automobile bicycle carriers have heretofore been made which support a bicycle at the rear end of a vehicle with the bicycle extending generally crosswise of the vehicle. A common former bicycle carrier has laterally spaced elongated frame members supported at their lower ends on the vehicle bumper to extend generally upright and laterally spaced bicycle support members extending generally horizontally from their upper ends for engaging and supporting one or more bicycles. It is not always convenient or possible to support the bicycle rack on the bumper, and it has also been proposed to support the elongated frame members by feet or pads on the vehicle body with the bicycle support members extending transverse to the frame member, for example as shown in U.S. Pat. No. 3,710,999. However in the bicycle carrier disclosed in that patent, the frame members are not maintained upright but instead inclined at an angle to the vertical dependant on the configuration of the vehicle body on which the rack was supported, and the bicycle engaging members were correspondingly inclined upwardly relative to a horizontal plane so that bicycles supported thereon would tend to move downwardly against the frame members and against each other.

SUMMARY OF THE INVENTION

The present invention relates to a bicycle carrier for supporting one or more bicycles at the rear of the vehicle to extend crosswise thereof.

An important object of this invention is to provide a bicycle carrier which can be supported at various different positions on different vehicle bodies and which is generally arranged to support one or more bicycles in a generally upright condition to minimize lateral pressure on the bicycle by either the carrier or by an adjacent bicycle during transportation of the same.

A more particular object of this invention is to provide a bicycle carrier having spaced side frames with resilient vehicle engaging feet to support the carrier on the body of the vehicle and with a pair of bicycle support members mounted on the side frames for angular adjustment relative thereto about a pivot axis extending crosswise of the side frames to enable the support members to extend generally horizontally for supporting the bicycle when the side frames are disposed in different positions on different vehicles.

Another object of this invention is to provide a bicycle carrier in which the bicycle support members can be swung out of the way when not in use.

Still another object of this invention is to provide a bicycle carrier which can be economically manufactured and which is easy to assemble and install on the vehicle.

These, together with other objects and advantages of this invention, are more readily understood by reference to the following detailed description when taken in connection with the accompanying drawings wherein:

FIG. 3 is a side elevational view of the bicycle carrier illustrating its mounting on one type of vehicle;

FIG. 4 is a side elevational view of the bicycle carrier illustrating its mounting on a different form of vehicle;

FIG. 5 is a side elevational view of the carrier shown adapted for mounting on a generally horizontal surface; and FIG. 6 is a plan view of the carrier shown in FIG. 5.

The automobile bicycle carrier of the present invention is arranged to support one or more bicycles at the rear of the vehicle and is adapted for use with vehicles of widely different shape and design including sedans, fastbacks and station wagons. The bicycle carrier in general includes a pair of rigid side frames 10 and 11 of generally U-shaped configuration and each including a pair of spaced leg portions 10a, 10b and 11a, 11b respectively that are interconnected at one end by connecting portions 10c and 11c. The side frames are advantageously formed of a light weight tubular stock which is bent intermediate its ends to form the aforementioned leg portions and intermediate connection portions, and resilient vehicle engaging feet 10d, 10e, and 11d, 11e are provided on the free ends of the leg portions of the side frames 10 and 11, respectively. The resilient vehicle engaging feet are herein shown in the form of resilient caps telescoped on the ends of the tubular leg portions of the side frames, a means such as a rigid washer (not shown) herein provided in the bottom of the socket portion of the caps to prevent the ends of tubular members from cutting the caps.

Figure 1:
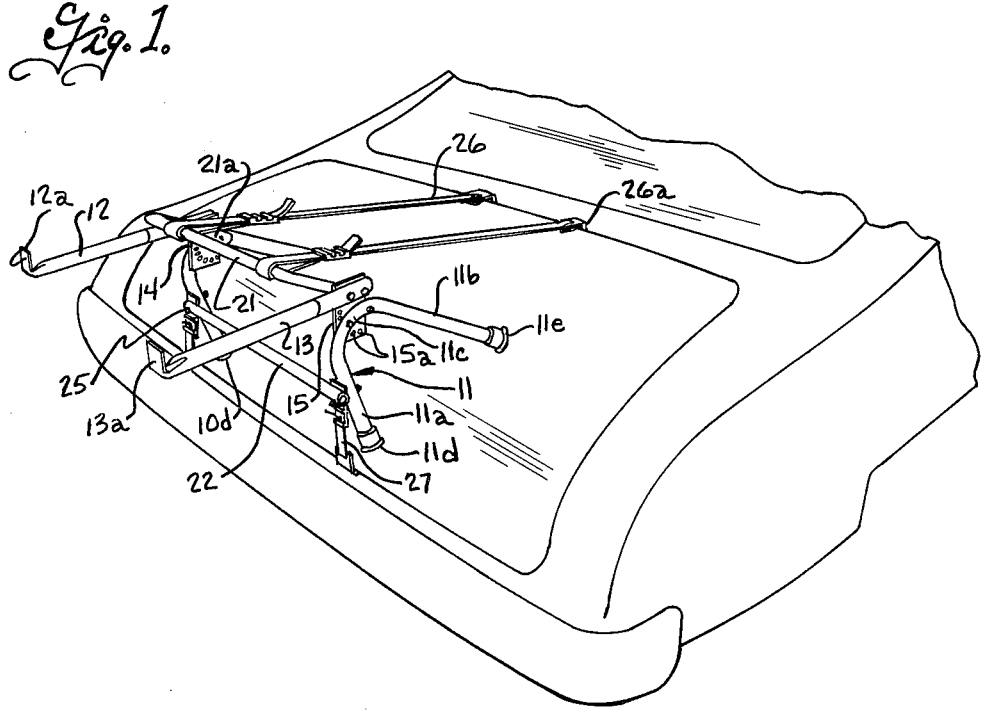
FIG. 1 is a fragmentary perspective view of a vehicle having the bicycle carrier of the present invention mounted thereon.
Figure 2:
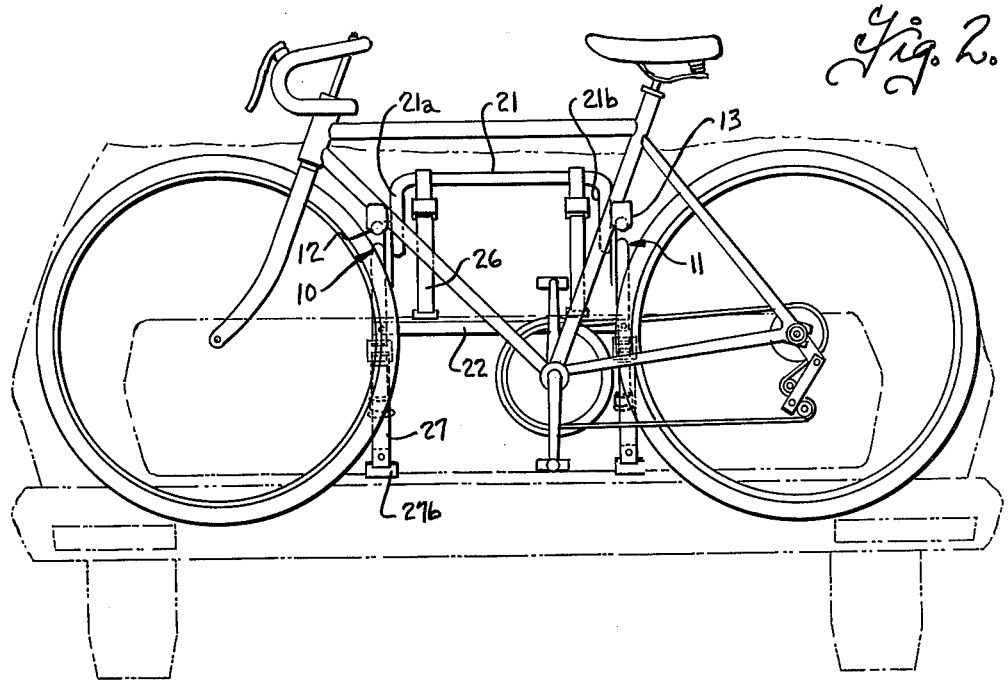
FIG. 2 is a rear elevational view of the bicycle carrier with the bicycle mounted thereon and attached to a vehicle shown in phantom.

A pair of elongated bicycle support members 12 and 13 are provided for supporting one or more bicycles and are mounted on the respective side frames 10 and 11 for angular adjustment about a pivot axis extending crosswise of the side frames to enable the support members to extend generally horizontally when the carrier is mounted on different vechicles. For this purpose, mounting plates 14 and 15 are attached as by bolts 16 to the connecting portions 10c and 11c of the respective side frames 10 and 11. The bolts 16 extend through openings in the side plates and side frames and preferably have wing nuts thereon which can be easily loosened to allow the mounting plates to pivot relative to the side frames about the axis of the bolts 16. The mounting plates 14 and 15 respectively have a plurality of openings 14a and 15a arranged in arcuate pattern concentric with the pivot axis of the bolts 16, and a second pair of bolts 17 are arranged to extend through openings in the connection portions 10c, 11c of the side frames and through selected ones of the openings 14a, 15a in the adjacent mounting plate and have wing nuts thereon to detachably secure the mounting plates to the side frames in a selected angularly adjusted position. The bicycle support members 12 and 13 are rigidly secured as by bolts 18 and 19 to the respective mounting plates 14 and 15 for angular adjustment therewith. The openings 14a and 15a in the mounting plates are arranged to enable adjustment of the support members through a range of positions angularly intermediate a position in which the support members extend generally perpendicular to a plane through the vehicle engaging feet on the side frames and a position in which the support members extend generally parallel to that plane. Thus, the support members can be adjusted to extend generally horizontally when the vehicle engaging feet are disposed in a generally upright plane, for example when attached to the rear of a station wagon or the like, as shown in FIG. 4, and the support members can also be adjusted to extend generally horizontally when the plane of the vehicle engaging feet is at various positions angularly intermediate an upright plane and a horizontal plane, for example when the side frames are supported on the deck lid of a sedan such as shown in FIGS. 1-3. The bicycle support members 12 and 13 are preferably covered by or enclosed in a resilient sheath (not shown) to prevent marring of the bicycle finish and have up-turned ends 12a, 13a to inhibit slipping of the bicycles off the arms. The resilient sheath can be in the form of a resilient tube that is slipped onto the members, or the members can be coated as by dipping in a resilient material such as plastic.

The mounting plates 14 and 15 are preferably located at the inner sides of the side frames 10 and 11 and the bicycle support members 12 and 13 are preferably located at the outer sides of the respective mounting plates at a location spaced above the pivot axis 16 sufficient to prevent interference between the ends of the bicycle support members and the side frames when the bicycle support members are adjusted to their different angular positions.

One or more cross members are provided to extend between the side frames to maintain the side frames and support members in laterally spaced relation. One cross member 21 is provided with laterally extending leg portions 21a and 21b at its opposite ends which are attached to the inner sides of the mounting plates 14 and 15. Leg portions 21a and 21b are advantageously secured to the mounting plates by the fasteners 16 and 18 that are respectively utilized for attaching the side frames and support members to the mounting plates. With this arrangement, the leg portions of the cross member are located at the sides of the mounting plate opposite the side frames and bicycle support members to reinforce the connection therebetween. Moreover, it will be seen that the cross member 21 is angularly adjustable with the mounting plates and bicycle support members. The cross member 21 also functions as an abutment to limit inward movement of the bicycles along the bicycle support members 12 and 13 and cross member 21 is also preferably provided with a resilient sheath (not shown). The sheath can be in the form of a resilient tube slipped over the cross member or can be applied by coating or dipping the cross member 21 in a resilient material such as plastic. A second cross member 22 is advantageously provided between the leg portions 10a and 11a of the side frames and is secured thereto as by fasteners 25.

The vehicle engaging feet on the side frames are adapted to rest directly on the vehicle body and straps 26 and 27 are provided for anchoring the bicycle carrier on the vehicle. Straps 26 are advantageously entrained over the cross member 21 and have hooks 26a and adjustable buckles 26b to enable adjustable anchoring of the straps on the edge of the automobile trunk deck, tail gate or drip bead and the like. Straps 27 are conveniently attached by buckles 27b to cross member 22 and have hooks 27a for adjustably securing the same to another abutment on the vehicle such as the lower edge of the trunk deck, bumber, or the like.

From the foregoing it is thought that the construction and use of the bicycle carrier will be readily understood. The vehicle engaging feet 10d, 10e and 11d, 11e are adapted to rest on the body of the vehicle such as on the turnk deck, the back of a station wagon, or the like. The angle of the plane of the vehicle engaging feet to the horizontal will vary in different vehicles, depending on the contours of the vehicle in the region where the carrier is mounted, and the bicycle support members 12 and 13 are angularly adjustable relative to the side frames so as to extend generally horizontally when the carrier is mounted on different vehicles. This enables the bicycles B to be mounted on the support members with the upwardly converging frame members F1 and F2 resting on the support members as shown in FIG. 2 and with the bicycle positioned generally upright. Thus, the bicycle is not urged laterally against the carrier or against an adjacent bicycle when more than one bicycle is mounted on the frame, to minimize damage to a bicycle during transportation. Straps, not shown, can be used to tie the bicycles to the rack and/or vehicle. The support members can also be adjusted to extend in an upwardly inclined position if desired and, additionally, can be swung upwardly and rearwardly when the bolts 17 are removed, so as to be out of the way when the rack is not in use. One of the legs 10b of each side frame is somewhat longer than the other leg 10a and, while the rack is herein shown with the support members projecting rearwardly from the shorter leg 10a, it is apparent that the side frame members can be attached in a reverse position on the mounting plates, if desired in some installations.

The embodiments of the invention in which an exclusive property or privilege is claimed are defined as follows:

1. An automobile bicycle carrier comprising:
 (a) a pair of rigid generally U-shaped side frames disposed in relatively parallel planes, said side frames each being of one-piece tubular stock and having an arcuate intermediate portion and two straight leg portions integral with the ends of the respective intermediate portion and diverging therefrom at an acute angle along lines generally tangent to the ends of the arcuate intermediate portion, whereby the spacing between the leg portions of each side frame is substantially greater at the free ends thereof than adjacent the respective arcuate intermediate portion; the leg portions having resilient vehicle engaging feet on the free ends thereof, one of said leg portions on each side frame being shorter than the other leg portion and extending generally perpendicular to a plane through the vehicle engaging feet, the other leg portion of each side frame extending at an acute angle to the plane through the vehicle engaging feet,
 (b) a pair of elongated bicycle support arms each of tubular stock and each having an upturned bicycle stop at one end,
 (c) a U-shaped cross member having lateral end portions connected to the other ends of respective ones of the bicycle support arms and a connecting portion extending between said lateral end portions to effect movement of said bicycle support arms in unison and to maintain said arms in parallel spaced relation,
 (d) said arcuate intermediate portions of said side frames each having spaced openings therethrough perpendicular to the plane of the respective side frame, means including fasteners extending through said spaced openings in the arcuate intermediate portions of the side frames attaching said other ends of said bicycle support arms to the arcuate intermediate portion of respective ones of said side frames for angular adjustment of the arms in planes paralleling the side frames through a plurality of positions with each of the arms extending generally horizontally outwardly from the arcuate intermediate portion of its associated frame at different angles to the plane through the vehicle engaging feet, and (e) strap means for attaching the bicycle carrier to a vehicle with the vehicle engaging feet resting on the vehicle.

2. An automobile bicycle carrier comprising:

(a) a pair of rigid generally U-shaped side frames disposed in relatively parallel planes, said side frames each being of one-piece tubular stock and having an arcuate intermediate portion and two straight leg portions integral with the ends of the respective intermediate portion and diverging therefrom at an acute angle along lines generally tangent to the ends of the arcuate intermediate portion whereby the spacing between the leg portions of each side frame is substantially greater at the free ends thereof than adjacent the respective arcuate intermediate portion, the leg portions having resilient vehicle engaging feet on the free ends thereof, (b) a pair of mounting plates each having a plurality of openings arranged in an arcuate pattern, each mounting plate being associated with a respective one of the side frames and having one side thereof disposed alongside the arcuate intermediate portions of its side frame, (c) a pair of elongated bicycle support arms each associated with a respective side frame and having one end portion overlapping said one side of the associated mounting plate, (d) a U-shaped cross member having lateral leg portions at opposite ends and a connecting portion extending between the leg portions, each leg portion of the cross member being associated with a respective one of the mounting plates and extending along the other side thereof, (e) and fastener means connecting the associated side frames, mounting plates, arms, and leg portions of the cross member, said fastener means including:

(1) a first fastener individual to each mounting plate that extends through each of the associated items, comprising the leg portion and mounting plate and arcuate intermediate portion of the side frame; (2) a second fastener individual to each mounting plate that extends through each of the associated items comprising the leg portion and mounting plate and said one end portion of the support arm, (3) a third fastener individual to each mounting plate that extends through the mounting plate and the bicycle support arm and (4) a fourth fastener that extends through the mounting plate and the arcuate intermediate portion of the side frame, one of said fasteners being disposed at a location to extend through a selected one of said openings in the associated mounting plate for securing the bicycle support arms in different positions extending generally horizontally outwardly from the arcuate intermediate portions of the side frame at different angles to a plane through the vehicle engaging feet, (f) and strap means for attaching the bicycle carrier to a vehicle with the vehicle engaging feet resting on the vehicle.

3. An automobile bicycle carrier according to claim 2 wherein said cross member has a portion extending above the bicycle support arms adjacent said one end thereof to provide a bicycle stop.

4. An automobile bicycle carrier according to claim 3 wherein said first fastener is located at the center of said arcuate pattern of openings.

5. An automobile bicycle carrier according to claim 2 wherein said first fastener is located at the center of said arcuate pattern of openings.

6. An automobile bicycle carrier according to claim 2 wherein one of said leg portions on each side frame is shorter than the other leg portion and extends generally perpendicular to a plane through the vehicle engaging feet, the other leg portion of each side frame extending at an acute angle to the plane through the vehicle engaging feet.

* * * * *

UNITED STATES PATENT AND TRADEMARK OFFICE
CERTIFICATE OF CORRECTION

PATENT NO. : 4,085,874
DATED : April 25, 1978
INVENTOR(S) : Joseph V. Graber

It is certified that error appears in the above-identified patent and that said Letters Patent are hereby corrected as shown below:

Claim 1, column 5, line 3, add -- side -- after "associated".

Signed and Sealed this

Fifteenth Day of August 1978

[SEAL]

Attest:

RUTH C. MASON
Attesting Officer

DONALD W. BANNER
Commissioner of Patents and Trademarks